(No Model.)
W. R. DINGMAN.
REFRIGERATOR ATTACHMENT FOR WELLS.
No. 335,686. Patented Feb. 9, 1886.
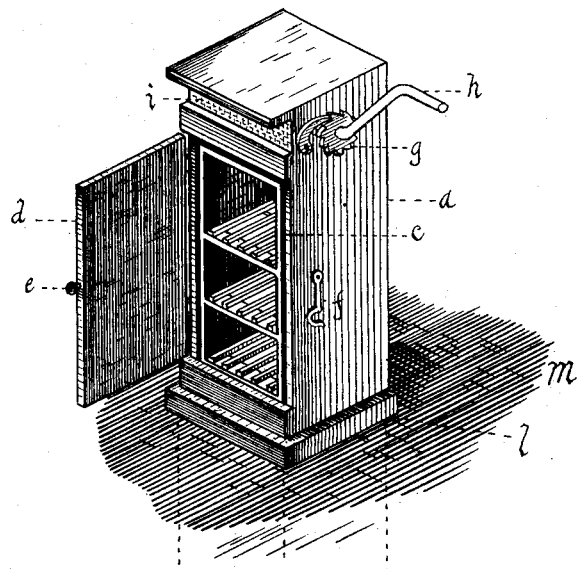
WITNESSES.
I. O. Eyman
J. N. Bills
INVENTOR
W. R. Dingman.
By L. P. Graham
atty.

UNITED STATES PATENT OFFICE.

WILLIAM R. DINGMAN, OF NIANTIC, ILLINOIS.

REFRIGERATOR ATTACHMENT FOR WELLS.

SPECIFICATION forming part of Letters Patent No. 335,626, dated February 9, 1886.

Application filed June 29, 1885. Serial No. 170,113. (No model.)

*To all whom it may concern:*

Be it known that I, WILLIAM R. DINGMAN, a resident of the town of Niantic, county of Macon, and State of Illinois, have invented certain new and useful Improvements in Refrigerator Attachments for Wells, &c., of which the following is a specification.

My invention is intended to provide cheap and effective means whereby articles of diet may be kept at an even low temperature in ordinary wells, while at the same time the said wells will have the benefit of a thorough and cleanly ventilation.

The common practice of providing wells with pumps in close-fitting platforms renders a method of well-ventilation very desirable, and the inaccessibility of a large percentage of the population to ice makes a cheap and effective well-refrigerator almost a necessity.

My device consists in a tubular casing, preferably square in cross-section, having a lateral door at its upper end, and a top with a projecting ledge. Under the projecting ledge is a ventilating-aperture covered with wire-netting for the exclusion of insects and other impurities, and at the lower end of the casing is a series of perforations that assist the net-covered aperture in keeping up a circulation of air.

In the casing is a food-receptacle that has free vertical motion, and a winch, also in the casing, provides means whereby the receptacle may be lowered and raised.

In the drawing accompanying and forming a part of this specification my device is represented in isometrical perspective.

*a* is a casing on the well-cover, provided with door *d*, ventilator *i*, pawl and ratchet *g*, and a windlass provided with crank *h*.

*b* is a continuation of casing *a*, that extends downwardly into the well.

*c* is a receptacle suspended from the windlass and adjusted to move vertically in casing *a b*.

The door *d* is provided with a suitable device, *e f*, wherewith it may be securely closed.

The suspending-line for the receptacle is secured to the windlass, and is of sufficient length to lower the receptacle to the bottom of the casing.

The receptacle is provided with slat-shelves to receive the articles and permit a constant circulation of air.

The ventilator *i* is covered with netting to exclude insects and impurities.

The ledge *l* rests on platform *m* and supports the device in position.

The bottom of the casing is designed to remain slightly above the surface of the water; but in order to insure a circulation of air, in case of an unusual rise in the water, perforations *k* are provided.

In operation the receptacle is filled, the door closed, and the receptacle sufficiently lowered; and the above-mentioned process is simply reversed when it is desired to use the refrigerated articles.

The length of the suspending-line usually determines the extent to which the receptacle is lowered, but the pawl and ratchet may be used to regulate the same.

The device is preferably placed immediately in the rear of the pump, as this position is at once convenient and stable, but it may be variously adjusted to suit various requirements.

By means of the net-covered aperture *i* pure air is constantly supplied to the well, and the receptacle *c* furnishes means whereby food may be readily lowered into the well, and thereby kept at an even low temperature.

The projecting ledge of the top of the casing protects the wire-netting from breakage and the aperture from liquid impurities.

I claim as new and desire to secure by Letters Patent—

1. The combined refrigerator and well-ventilator herein set forth, consisting in the combination of casing *a b*, inclosed at its upper end, with the exception of lateral aperture *i*, and having said aperture net-covered, a suitable door, a pendulous receptacle, and suitable means of raising and lowering said receptacle, as set forth.

2. Casing *a b*, having a top with a projecting ledge, and a net-covered aperture under the projecting ledge, door d, pendulous receptacle c, and suitable means for lowering and raising said receptacle, as set forth.

3. Casing a b, having a top with a projecting ledge, and a net-covered aperture under the ledge, a lateral door, a pendulous receptacle in the casing, and a winch, also in the casing, by means of which the receptacle is raised and lowered, as set forth.

In testimony whereof I sign my name in the presence of two subscribing witnesses.

WILLIAM R. DINGMAN.

Attest:
PARK HAMMER,
L. P. GRAHAM.